Patented Oct. 8, 1940

2,217,265

UNITED STATES PATENT OFFICE 2,217,265

WOOD PROTECTION

Francis E. Cislak, Indianapolis, Ind., assignor to Peter C. Reilly

No Drawing. Application September 16, 1938, Serial No. 230,208

5 Claims. (Cl. 21—45)

My invention is directed generally to the preservation or protection of wood, and has for its object the obtaining jointly of the advantages individually resulting from creosote-impregnation and a surface coating with paint or varnish. More specifically, it is the object of my invention to provide a coating for creosoted wood which effectively protects the surface, conceals and covers the creosote, and through which the creosote will not penetrate.

I use the term creosote generically, to designate the wood-preservative oils which are derived from tars and pitches of all sorts, including especially coal-tar creosote, wood-tar creosote, and petroleum products.

Creosote has highly valuable wood-preserving properties; but it imparts a distinctive color and oiliness to wood which because of their persistence and objectionable character limit the uses of creosoted wood. For instance, most people consider it highly unsuitable for frame dwelling-houses, because it has been substantially impossible heretofore to coat it over with any coating material through which it will not penetrate or "bleed."

I am aware that many previous attempts have been made to cover and hide the creosote in creosoted wood, and to prevent the creosote from "bleeding" through subsequently applied coatings of various kinds. Sometimes this has involved the removal of the creosote from the superficial portions of the wood, as by dissolving it out with various solvents. Sometimes alcoholic solutions of shellac have been applied. But so far as I am aware, no one heretofore has succeeded in painting over creosoted wood with a coating that is impervious to the creosote as well as the elements.

My present invention overcomes the objections which have heretofore applied to creosoted wood. By my invention, for example, it becomes possible to use creosote to preserve wood in and around a dwelling house, and to cover the creosoted wood with a coating which completely conceals the creosote and permits any desired final color to be obtained.

In accordance with my invention, the creosote may be applied to the wood in any usual or convenient manner, preferably by impregnation under pressure; and when the creosote is sufficiently dry so that there is no free liquid creosote on the surface, the creosoted wood is coated with a paint or varnish comprising a phenol-formaldehyde resin and, desirably, a catalyst acting to promote the setting of such resin. Preferably I employ phenol-formaldehyde resins of the thermo-setting type and use a suitable acid as a catalyst.

The nature of a paint or varnish embodying my invention may vary considerably. It may be a simple varnish comprising the phenol-formaldehyde resin in a suitable volatile solvent, with or without a catalyst; or it may be a paint made similarly to the varnish but including a filler and a pigment to impart the desired color.

As an example of a resin suitable for use in practicing my invention, I may employ the resin produced by the following process. A solution of 648 gms. of cresol (for example, m-p-cresol containing about 12% o-cresol),
584 gms. of 37% aqueous formaldehyde, and
1.62 gms. of sodium hydroxide dissolved in 16 cc. of water is refluxed on a water bath for about 55 minutes. At the conclusion of this operation, the sodium hydroxide is neutralized, as by the addition of 2.7 cc. of glacial acetic acid, and the water removed by vacuum distillation, about 2½ hours being required for this removal. The yield of resin is 780 gms. This resin may be dissolved in 260 gms. of denatured alcohol for further processing.

To produce a simple varnish from the above solution, it may be thinned further, preferably with a less volatile solvent, to improve its spreading qualities. About 40 gms. of butyl alcohol added to the solution produced by the above process will give satisfactory results. A varnish thus prepared, when applied to creosoted wood, will adhere satisfactorily thereto, and the creosote will not "bleed" through it. However, the varnish will not set quickly, but will remain tacky for an extended period. To promote setting of the varnish, there may be incorporated in it a catalyst, conveniently an acid. I prefer to employ oxalic acid which, when added to the above varnish in quantity of about 0.7 gm., will cause the varnish to set in 24 to 48 hours.

To make a paint from the resin solution produced as above described a filler and a pigment giving the desired color are added. To produce a yellow paint, for example, I may add the following ingredients to 225 parts of the resin solution:

| | Parts |
|---|---|
| Chrome yellow | 180 |
| Talc (200 mesh) | 120 |
| Denatured alcohol | 45 |
| Butyl alcohol | 30 |
| Oxalic acid hydrate | ⅙ |

This entire mixture is ground in a ball mill for about 10 hours. The resulting paint may be applied to creosoted wooden articles, such as creosoted telegraph poles, creosoted wood-block floors, creosoted lumber, etc., by means of a brush. Two coats are generally applied, allowing 24 to 48 hours between coats.

As another example of a phenol-formaldehyde suitable for use in practicing my invention, I may employ a phenol-formaldehyde resin produced by refluxing for 60 minutes a solution embodying 470 gms. of phenol, 488 gms. of 37% aqueous formaldehyde, and 4 gms. of sodium hydroxide, neutralizing the sodium hydroxide at the end of the reflux period with 6.2 gms. glacial acetic acid, and removing the water by vacuum distillation as before.

The periods of refluxing and distillation will vary somewhat with operating conditions and quantities. They are controlled with regard to the desired viscosity of the paint or varnish in which the resin is to be embodied and such control usually results in a resin which is approaching insolubility in the solvent in which it is subsequently to be dissolved.

It is to be understood that my invention is not limited to the specific examples set forth above. Suitable catalysts other than the oxalic acid mentioned specifically above include acetic acid, tartaric acid, stannous chloride, and other substances. Even a mineral acid might be used; but I find, in general, that the common mineral acids may have a tendency to result in alteration of any pigment employed. The pigment used will of course depend upon the color desired. In addition to the chrome yellow mentioned above, I have used chrome green, Venetian red, burnt umber, cadmium red, cadmium sulphide, and carbon black, as well as mixtures of those pigments. Suitable fillers, in addition to talc, are wood flour, ground silica, asbestos floats, diatomaceous earth, various clays, powdered mica, etc.

A phenol-formaldehyde resin incorporated in a paint or varnish in accordance with my invention is, when the resin has set, insoluble in creosote; and as a result, the creosote does not "bleed." Its weathering qualities adapt it for use on exposed surfaces and its wearing qualities for use on floors. Further, since it can be produced in a wide variety of colors, its field of application is wide.

I claim as my invention:

1. A wood article having a creosote-impregnated surface coated with a solution in a volatile solvent of a thermo-setting phenol-formaldehyde resin and a catalyst accelerating setting of such resin.

2. A wood article having a creosote-impregnated surface coated with a paint comprising a solution of a phenol-formaldehyde resin in a volatile solvent, a pigment, and a catalyst promoting setting of such resin.

3. The process of protecting wood, which comprises impregnating the wood with creosote and then applying to the creosote-impregnated surface of the wood a coating comprising a solution of a phenol-formaldehyde resin in a volatile solvent.

4. The process of protecting wood, which comprises impregnating the wood with creosote and then applying to the creosote-impregnated surface of the wood a coating comprising a solution of a phenol-formaldehyde resin in a volatile solvent, and a pigment.

5. The process of protecting wood, which comprises impregnating the wood with creosote and then applying to the creosote-impregnated surface of the wood a coating comprising a solution of a phenol-formaldehyde resin in a volatile solvent, and a catalyst promoting setting of such resin.

FRANCIS E. CISLAK.